(12) United States Patent
Kaga et al.

(10) Patent No.: US 7,775,058 B2
(45) Date of Patent: Aug. 17, 2010

(54) COOLER AND REFRIGERATOR

(75) Inventors: Shinichi Kaga, Toyoake (JP); Naoshi Kondo, Toyoake (JP); Yoshiyasu Suzuki, Toyoake (JP); Akihiko Hirano, Toyoake (JP); Tadashi Sakai, Toyoake (JP)

(73) Assignee: Hoshizaki Denki Kabushiki Kaisha, Aichi (JP)

( * ) Notice: Subject to any disclaimer, the term of this patent is extended or adjusted under 35 U.S.C. 154(b) by 336 days.

(21) Appl. No.: 11/885,550

(22) PCT Filed: Feb. 22, 2006

(86) PCT No.: PCT/JP2006/303197

§ 371 (c)(1),
(2), (4) Date: Sep. 4, 2007

(87) PCT Pub. No.: WO2006/095571

PCT Pub. Date: Sep. 14, 2006

(65) Prior Publication Data

US 2008/0163632 A1 Jul. 10, 2008

(30) Foreign Application Priority Data

Mar. 8, 2005 (JP) .............................. 2005-064133

(51) Int. Cl.
*F25B 49/00* (2006.01)
(52) U.S. Cl. ............................ 62/228.4; 62/157; 62/231
(58) Field of Classification Search .................. 62/157, 62/231, 228.1, 228.4, 228.5
See application file for complete search history.

(56) References Cited

U.S. PATENT DOCUMENTS

| | | | | |
|---|---|---|---|---|
| 4,662,185 A | * | 5/1987 | Kobayashi et al. | 62/228.4 |
| 4,734,628 A | * | 3/1988 | Bench et al. | 388/811 |
| 5,224,355 A | * | 7/1993 | So et al. | 62/229 |
| 5,269,152 A | * | 12/1993 | Park | 62/89 |
| 5,548,969 A | * | 8/1996 | Lee | 62/228.4 |
| 5,678,416 A | * | 10/1997 | Yoo et al. | 62/180 |

(Continued)

FOREIGN PATENT DOCUMENTS

DE 198 46 860 4/2000

(Continued)

OTHER PUBLICATIONS

Supplementary European Search Report dated Nov. 12, 2009 in corresponding European Patent Application No. 06714337.

*Primary Examiner*—George Nguyen
(74) *Attorney, Agent, or Firm*—Wenderoth, Lind & Ponack, L.L.P.

(57) ABSTRACT

In controlled cooling operation, data on the controlled cooling operation characteristics is read out from a memory and compared with a drop degree of an inside temperature actually measured by an inside temperature sensor 46, and a cooling device is operated so that the inside temperature drops following a temperature curve stored in advance. A state where the inside temperature is higher than the set temperature by 7 K or more lasts for 15 minutes, for example, the cooling capacity by the cooling device is increased than the cooling capacity based on control of a controlled operation controller so that even if a door 17 is frequently opened/closed and the inside temperature tends to gradually rise, it can be detected at an early stage and kept close to the set temperature.

3 Claims, 16 Drawing Sheets

U.S. PATENT DOCUMENTS

| | | |
|---|---|---|
| 5,699,674 A | 12/1997 | Lee et al. |
| 5,787,718 A * | 8/1998 | Jeong .................... 62/157 |
| 6,058,722 A * | 5/2000 | Choi ...................... 62/153 |
| 6,116,036 A | 9/2000 | Canavesi et al. |
| 6,216,478 B1 * | 4/2001 | Kang ................... 62/228.4 |
| 6,691,524 B2 * | 2/2004 | Brooke ................... 62/180 |
| 6,729,147 B2 * | 5/2004 | Lee ....................... 62/131 |
| 6,769,265 B1 * | 8/2004 | Davis et al. ........... 62/228.4 |

FOREIGN PATENT DOCUMENTS

| | | |
|---|---|---|
| EP | 0 976 996 | 2/2000 |
| EP | 1 030 147 | 8/2000 |
| EP | 1 564 513 | 8/2005 |
| JP | 62-91772 | 4/1987 |
| JP | 63-271079 | 11/1988 |
| JP | 05093570 A * | 4/1993 |
| JP | 10-009739 | 1/1998 |
| JP | 2000-205723 | 7/2000 |
| JP | 2002-013858 | 1/2002 |
| JP | 2002-195719 | 7/2002 |
| WO | 2005/038365 | 4/2005 |

\* cited by examiner

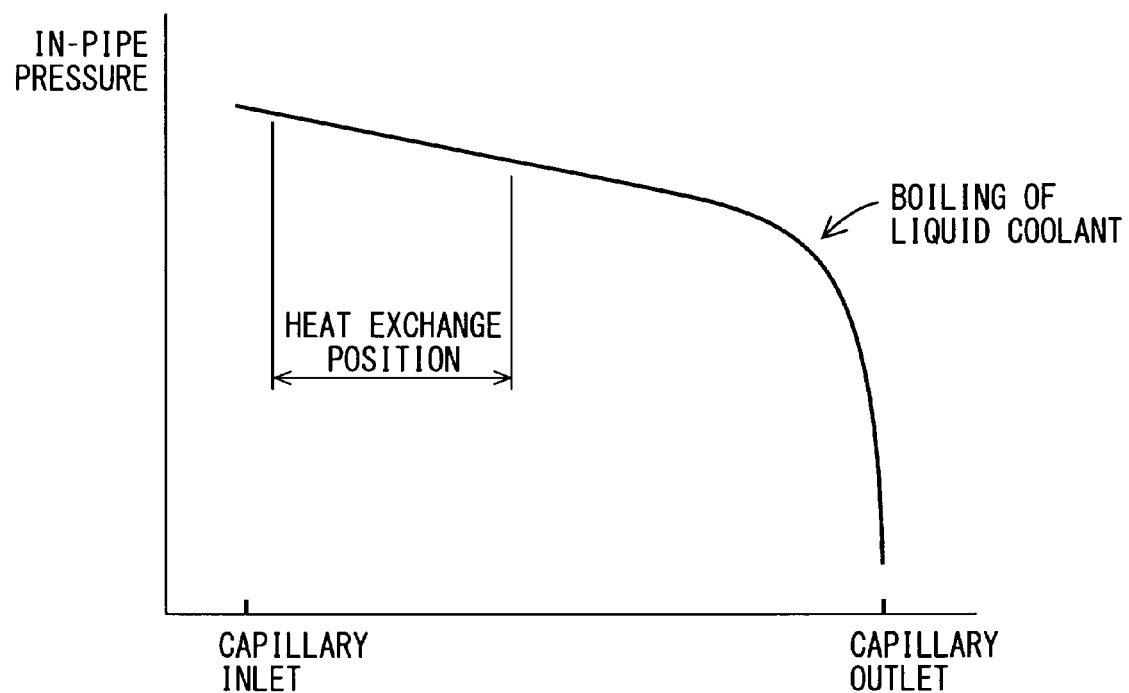

COOLER AND REFRIGERATOR

TECHNICAL FIELD

The present invention relates to a cooler and refrigerator and particularly to a cooler and refrigerator in which operation control during controlled cooling operation is improved.

BACKGROUND ART

Recently, a cooler and refrigerator for professional-use, for example, provided with an inverter compressor capable of speed control has been used (See Patent Document 1, for example).

There are several advantages to provide an inverter compressor and one of them is higher efficiency in controlled cooling operation. This control is provided to lower a speed (number of rotations) of the inverter compressor in a stepped manner in the vicinity of a set temperature during the controlled cooling operation for maintaining the inside of the cooler and refrigerator in the vicinity of the set temperature. With this control method, a continuous ON time of the compressor becomes overwhelmingly longer, in other words, the number of switching times between ON and OFF is drastically reduced and operation is carried out at a low rotation, which promotes higher efficiency and saving of energy.

In the above control, cooling capacity during low-speed operation of the inverter compressor needs to be set to exceed an assumed standard thermal load. If the cooling capacity does not reach the assumed thermal load, the inside temperature does not fall to the set temperature but is thermally balanced and does not reach the set temperature.

[Patent Document 1]: Japanese Patent Laid-Open No. 2002-195719

Though the inverter compressor is operated at a low speed, the thermal load can get larger than expected in some cases, particularly with a cooler and refrigerator for professional-use depending on conditions such as heat capacity of food materials, ambient temperature, and opening/closing frequency of a door. Also, there is a possibility that the inside temperature remains before the set temperature for a long time or even though the temperature drops, the change is too slight, resulting in the ON time becoming abnormally long.

However, continuous operation while the compressor is kept ON in this way is not particularly preferable. That is because frost keeps on adhering to a cooler by air intruding from outside at opening/closing of the door or steam from the food materials, and its gradual growth results in lower heat exchanging capability of the cooler.

The inventors have already developed a technology to prevent continuous cooling operation by carrying out operation that the inside is cooled all the time at a cooling speed determined in advance in the controlled cooling operation (See Patent Application No. 2003-359715, for example). This technology is configured so that data indicating a preferable temporal change mode of temperature drop (target cooling speed) is stored in advance, actual cooling speed is measured at the controlled cooling operation and compared with the data, and the cooling operation is carried out so that the both the target cooling speed and the controlled cooling operation accord to each other.

DISCLOSURE OF THE INVENTION

Problem to be Solved by the Invention

However, with the above configuration where the cooling operation is carried out based on the change mode of the temperature drop, the inside temperature can gradually rise in rare cases has been found. The cause of this is presumed as follows.

When the inside temperature is close to the set temperature, for example, if the door of the cooler and refrigerator is opened (See time t0 in FIG. 15), air inside flows out to the outside and the outside air (at a relatively high temperature) flows into with that and the inside temperature rapidly rises. As a result, the compressor is operated while the inside temperature exceeds an upper limit value of the set temperature and the cooling operation is started, and if the door is closed (See time t1), the inside temperature drops. The cooling speed when the door is merely opened and nothing is stored inside is considered to be faster than the target cooling speed since the thermal load is small (The target cooling speed is set so that sufficient cooling can be obtained even if materials are stored inside). Even if the door is opened again after the door is closed, when the door is opened after the inside temperature is cooled close to the set temperature (See time t2), there should be no problem.

However, in rare cases, opening of the door might be repeated after the door is closed once before the inside temperature is cooled close to the set temperature. Then, as shown at time t3 and after, though the inside temperature gradually rises, the cooling device is brought into intermittent operation while the cooling capacity is kept low.

The present invention was made in view of the above circumstances and has an object to provide a cooler and refrigerator in which a cooling device is stopped as appropriate so as to prevent frost formation to a cooler in the controlled cooling operation and to prevent gradual rise of an inside temperature even if a door is frequently opened/closed.

Means for Solving the Problem

As means to achieve the above object, the present invention is, in a cooler and refrigerator in which based on comparison between an inside temperature measured by an inside temperature sensor and a set temperature determined in advance, controlled cooling operation is carried out for maintaining the inside temperature substantially at the set temperature by controlling operation of a cooling device for cooling the inside, characterized in that the cooling device is made as a variable cooling capacity type, a memory device storing controlled cooling operation characteristics indicating a temporal change mode of temperature drop to be a target in a temperature region for the controlled cooling operation as data, a controlled operation controller for changing the capacity of the cooling device so that the inside temperature measured by the inside temperature sensor drops according to the controlled cooling operating characteristics read out from the memory device, and a high-temperature compensation controller for increasing a cooling capacity of the cooling device higher than the cooling capacity based on control of the controlled operation controller on the condition that the inside temperature becomes higher than the set temperature by a predetermined temperature.

In the present invention, the cooling device further comprises an inverter compressor capable of speed control, and the controlled operation controller comprises a temperature change calculation portion for calculating a drop degree of the inside temperature based on a signal from the inside temperature sensor at every predetermined sampling time, a target cooling speed output portion for outputting a target cooling speed for the inside temperature for this sampling time based on the controlled cooling operation characteristics stored in the memory device at said sampling time, a comparison portion for comparing an actual cooling speed calculated by the temperature change calculation portion and the target cooling speed outputted from the target cooling speed output portion, and a speed control portion for increasing the cooling capacity when the actual cooling speed is smaller than the target cooling speed and for lowering the cooling capacity when the actual cooling speed is larger than the target cooling speed based on a comparison result of the comparison portion.

With this configuration, during operation of the inverter compressor in the controlled cooling operation, the actual cooling speed is calculated based on the detected inside temperature at every predetermined sampling time, while the target cooling speed for the inside temperature is outputted from the data of the controlled cooling operation characteristics. If the actual cooling speed is smaller than the target cooling speed, the inverter compressor is controlled to increase its speed, while in the opposite case, the speed-reduction control for reducing the speed or stopping the inverter compressor is carried out, and by repetition thereof, the controlled cooling operation is executed according to the predetermined controlled cooling operation characteristics.

Also, an uncooled state memory device is provided which is reset when the inside temperature is higher than a temperature region for the controlled cooling operation and is set after the inside temperature is cooled to the temperature region for the controlled cooling operation, and invalidating means may be provided for invalidating control by the high-temperature compensation controller when the uncooled state memory device is in the reset state.

With this configuration, at installation of the cooler and refrigerator or once the controlled cooling operation is carried out and then, frost removing operation is executed for melting frost by heating the cooler, the inside temperature becomes higher than the temperature region at which the controlled cooling operation is carried out. In this case, since the uncooled state memory device is reset and the control by the high-temperature compensation controller is invalidated by the invalidating means, the inside temperature can be lowered with the cooling operation characteristics with more emphasis on quickness. Also, once the inside temperature is cooled to the temperature region for the controlled cooling operation, the uncooled state memory device is brought into the set state, the high-temperature compensation controller is validated, and abnormal rise of the inside temperature can be assuredly prevented.

Also, the high-temperature compensation controller can be configured to be operated on the condition that the inside temperature higher than the set temperature by a predetermined temperature continues for a predetermined reference time, and the invalidation means can be configured to prevent operation of the high-temperature compensation controller by setting the reference time of the high-temperature compensation controller longer. Thus, if cooling required a longer time since the door is frequently opened/closed immediately after installation of the cooler and refrigerator, for example, the inside temperature higher than the set temperature by the predetermined temperature would continue for the reference time or longer, and the high-temperature compensation controller is operated for cooling.

Effect of the Invention

In the present invention, in the controlled cooling operation, data on the controlled cooling operation characteristics is read out from the memory device and compared with the drop degree of the inside temperature actually measured by the inside temperature sensor, and the cooling device is operated so that the inside temperature is lowered according to the temporal change mode of temperature drop stored in advance. Operation with high efficient controlled cooling operation characteristics are realized, and by setting so that a lower limit temperature is reached in an appropriate time, energy-saving operation is possible and the operation of the cooling device is assuredly stopped so as to prevent frost formation in a large quantity to an evaporator.

Moreover, since the high-temperature compensation controller is provided so that the cooling capacity of the cooling device is made higher than the cooling capacity based on the control of the controlled operation controller on the condition that the inside temperature becomes higher than the set temperature by the predetermined temperature, even if the door is frequently opened/closed and the inside temperature is gradually raised, it can be detected at an early stage and the inside temperature can be kept around the set temperature.

BRIEF DESCRIPTION OF THE DRAWINGS

FIG. 5B is a graph showing a pressure change inside a capillary tube;

DESCRIPTION OF SYMBOLS

31: Cooling device, 32: Inverter compressor (compressor), 36: Evaporator, 45: Control portion (control means), 46: Inside temperature sensor (inside temperature sensor), 49:

Data storing portion (memory device), 50: Inverter circuit, TO: Set temperature, TU: Upper limit temperature, TL: Lower limit temperature

BEST MODE FOR CARRYING OUT THE INVENTION

Several embodiments of the present invention utilized in a cooler and refrigerator for professional-use will be described based on the attached drawings.

First Embodiment

A first embodiment of the present invention will be described referring to FIGS. 1 to 10.

Figure 1:
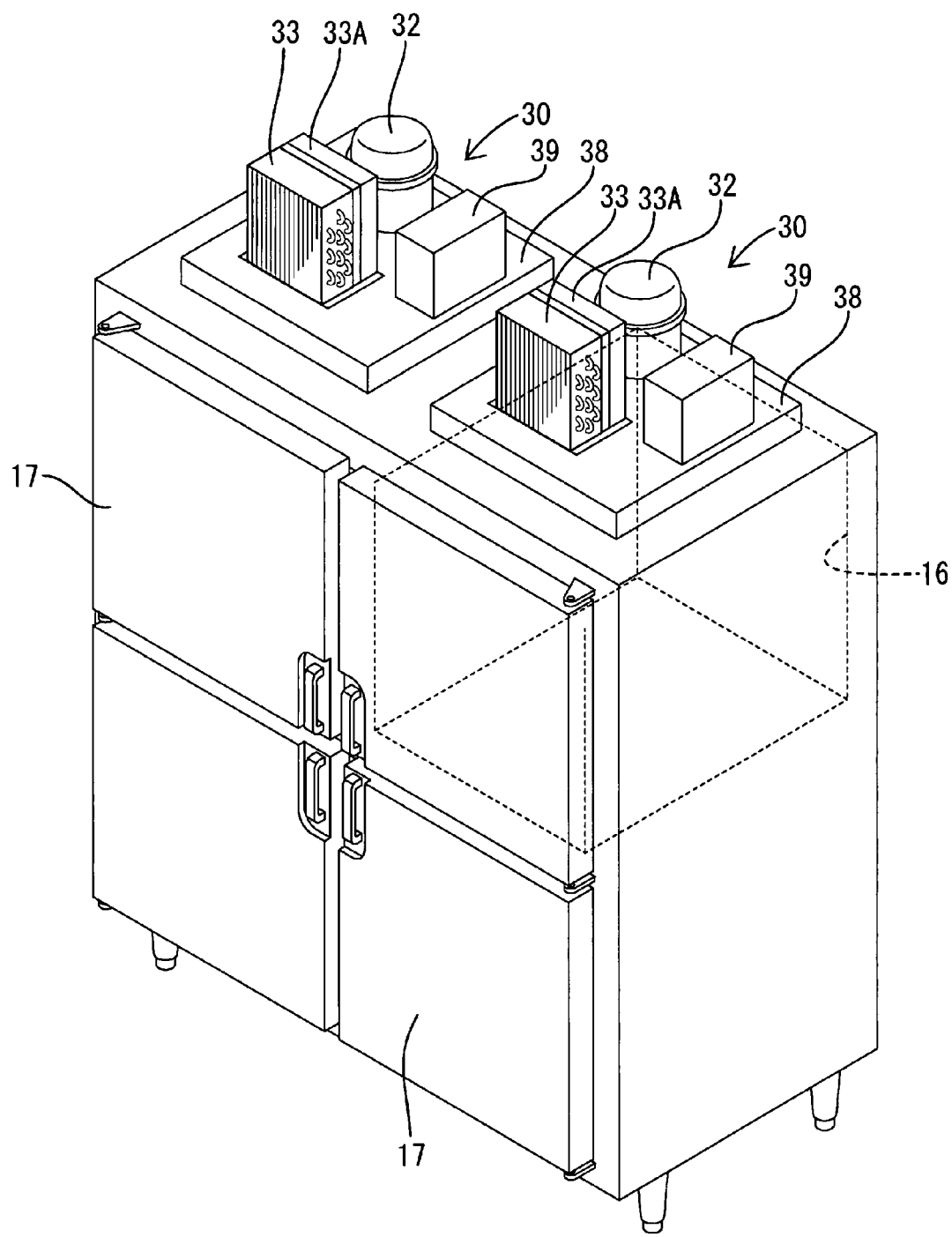
FIG. 1 is a perspective view of a cooler and refrigerator according to a first embodiment of the present invention.
Figure 2:
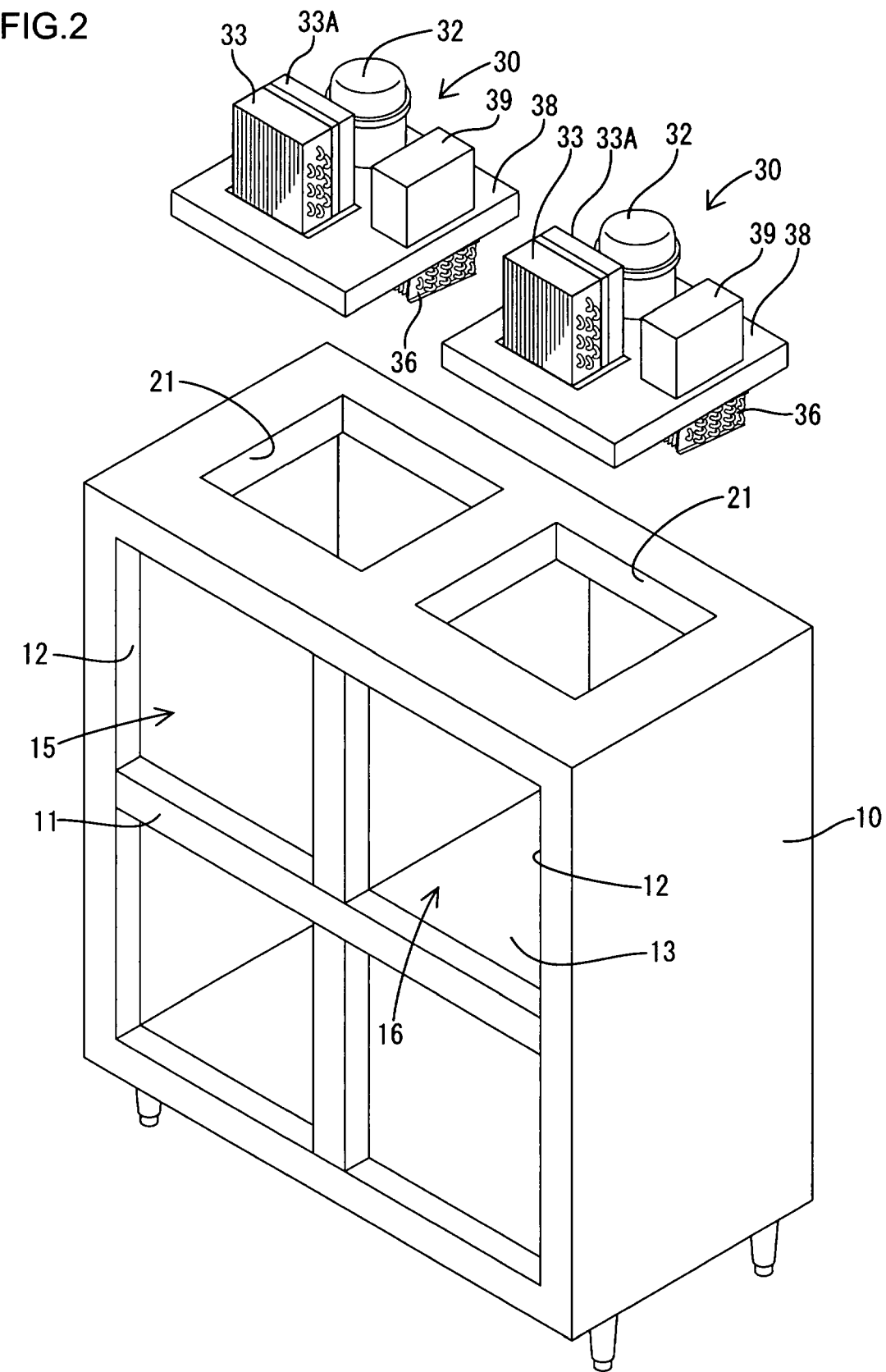
FIG. 2 is an exploded perspective view of the same.
Figure 3:
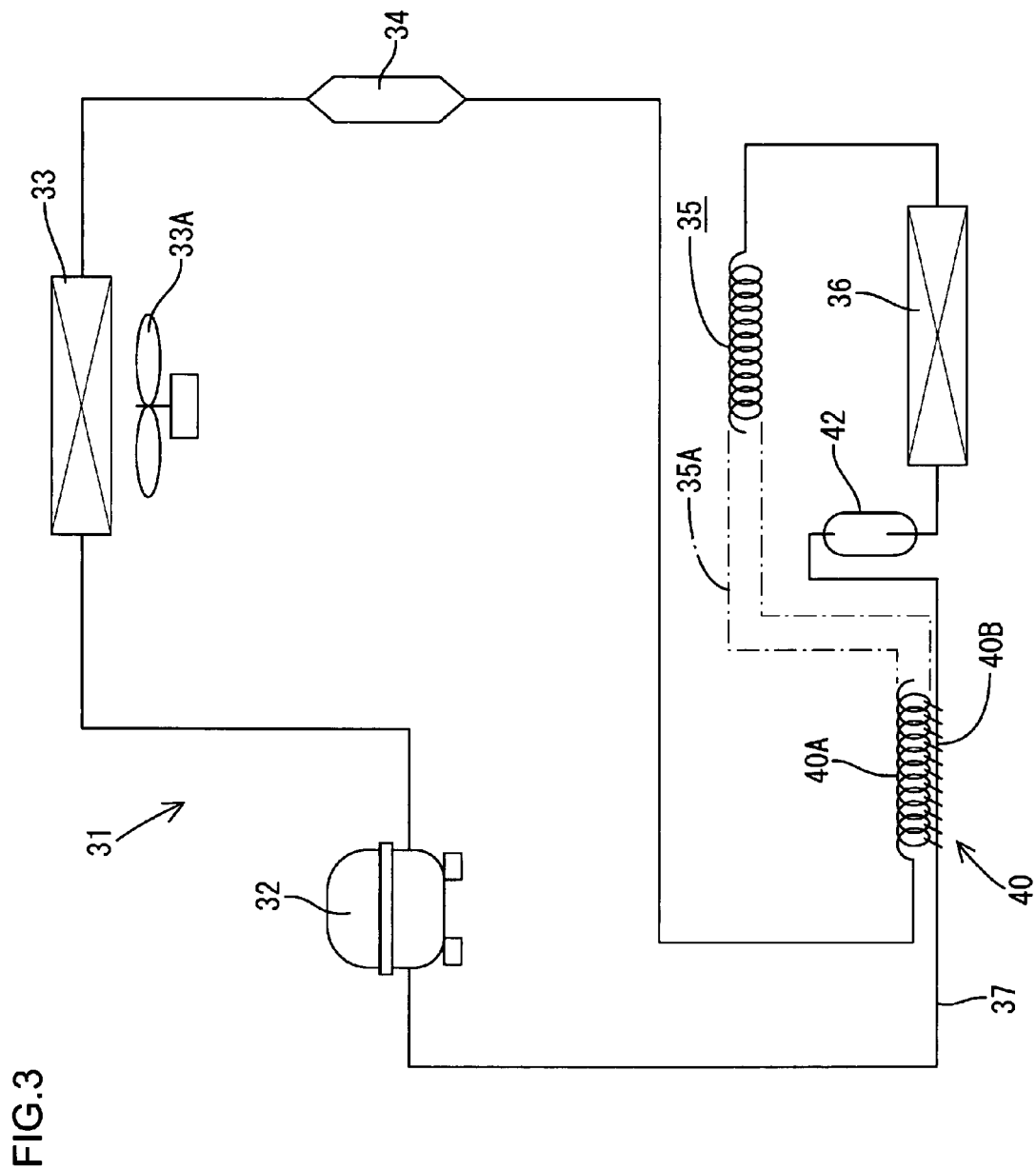
FIG. 3 is a freezing circuit diagram.

The cooler and refrigerator is a four-door type, and as shown in FIGS. 1 and 2, a main body 10 made of an insulating box body whose front face is opened is provided, four entrances/exits 12 are formed on the front-face opening by being partitioned by a cross partition frame 11, and an internal space of approximately ¼ of the region corresponding to the entrance/exit 12 at the upper right part when seen from the front is partitioned by an insulating partition wall 13 to be formed as a freezer chamber 16, while the remaining approximately ¾ of the region is formed as a refrigerating chamber 15. An insulating door 17 is attached to each entrance/exit 12 capable of swing opening/closing.

On the top face of the main body 10, a machine chamber 20 is configured by installing a panel 19 (See FIG. 4) upright or the like. On the top face of the main body 10 to be the bottom face of the machine chamber 20, rectangular openings 21 are formed in the same size as a ceiling wall of the refrigerating chamber 15 and a ceiling wall of the freezing chamber 16, respectively. To each of the openings 21, a cooling unit 30 is individually attached.

The cooling unit 30 is, though the detail will be described later, configured so that a compressor 32, a condenser 33 with a condenser fan 33A, a dryer 34, a capillary tube 35 and a cooler 36 are connected for circulation by a coolant piping 37 so as to configure a cooling device 31. Also, an insulating unit table 38 is loaded so as to block the opening 21, and the cooler 36 (among the constituent members of the cooling unit 30) is mounted on the lower face side of the unit table 38, while the other constituent members are on the upper face side.

Figure 4:
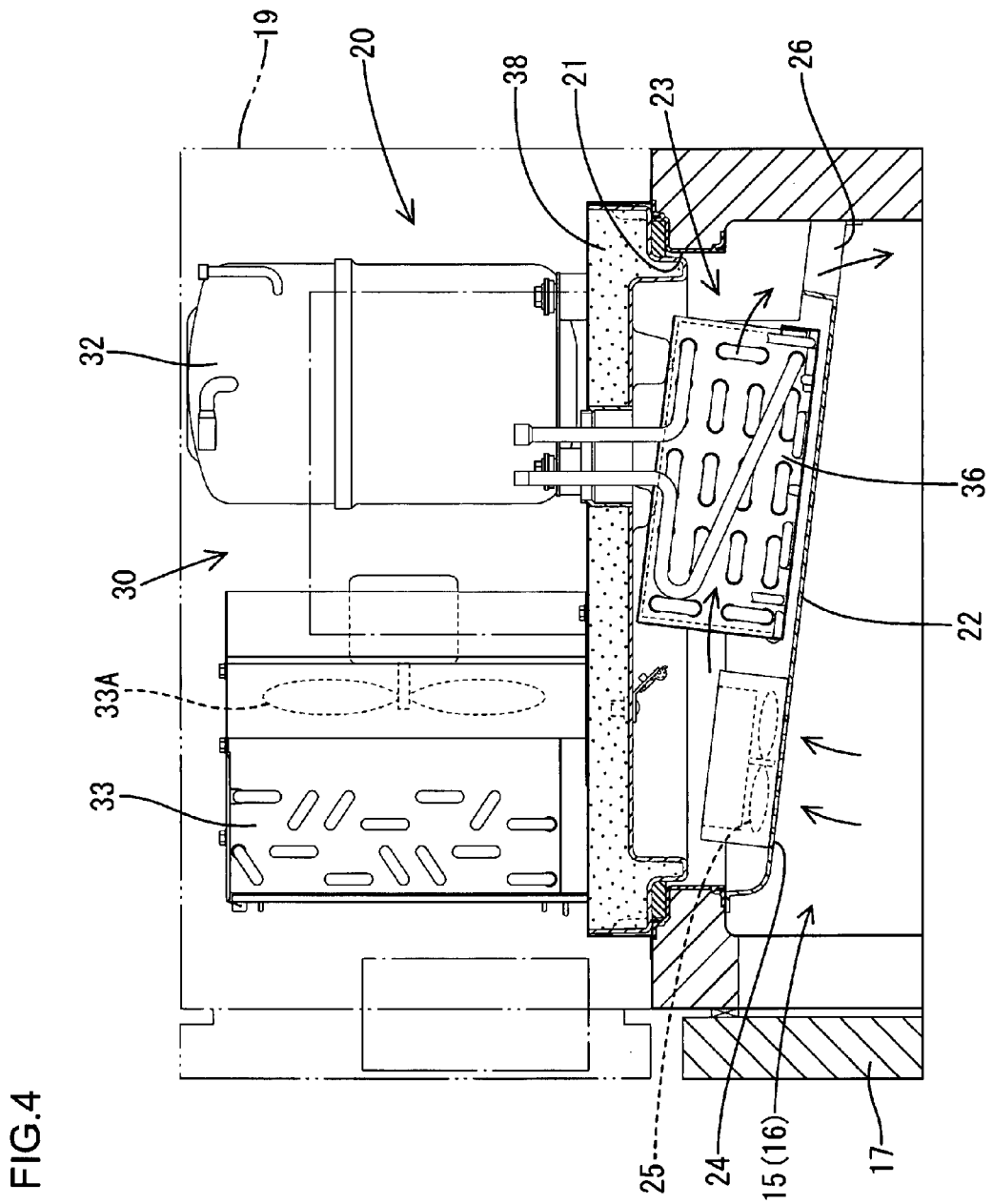
FIG. 4 is a partial sectional view of a state where a cooling unit is installed.

On the other hand, on the ceiling portions of the refrigerating chamber 15 and the freezing chamber 16, as shown in FIG. 4, a drain pan 22 (also functioning as a cooling duct) extends toward the depth side with a descending gradient so that a cooler chamber 23 is formed between it and the unit table 38. A suction port 24 is provided on the upper side of the drain pan 22 with a cooling fan 25 equipped, and a discharge port 26 is formed on the lower side.

When the cooling unit 30 and the cooling fan 25 are driven, as shown by an arrow in the figure, air in the refrigerating chamber 15 (freezing chamber 16) is sucked from the suction port 24 into the cooler chamber 23, cold air generated by heat exchange during passage through the cooler 36 is circulated as being blown out of the discharge port 26 into the refrigerating chamber 15 (freezing chamber 16), and thus, the inside of the refrigerating chamber 15 (freezing chamber 16) is cooled.

In this embodiment, the cooling unit 30 is attached to the refrigerating chamber 15 and the freezing chamber 16, respectively, and a similar cooling unite 30 is commonly used for both, wherein the following measures are taken for that purpose.

First, the cooling capacity of the cooling unit 30 is determined by a volume of the compressor, but with the compressor having the same capacity. For example, the cooling unit 30 on the freezing side with a lower evaporation temperature need cool only a smaller volume as compared with the refrigerating side. Thus, between the refrigerating chamber 15 and the freezing chamber 16, the one with a larger volume naturally needs a larger cooling capacity.

That is, the required cooling capacity is different whether it is freezing or refrigerating, or depending on conditions such as the size of the internal volume, and the inverter compressor 32 having the required maximum volume and capable of controlling the rotation number is used for the compressor.

Next, the capillary tube 35 is described an can be used both for refrigerating and freezing. The capillary tube 35 corresponds to a portion from the outlet of the dryer 34 to the inlet of the cooler 36 in FIG. 3, and a helical portion 35A is formed so as to make the length longer at the center portion. The entire length of the capillary tube 35 is set to 2000 to 2500 mm in this embodiment. The length of the coolant piping 37 from the outlet of the cooler 36 to the suction port of the inverter compressor 32 is approximately 700 mm.

For the capillary tube in general, the one with an emphasis on high flow-rate characteristics is used for refrigerating and the one with an emphasis on low flow-rate characteristics is used for freezing conventionally. But in this embodiment, those with intermediate flow-rate characteristics between the one for refrigerating and the one for freezing are used for the capillary tube 35.

Here, the capillary tube suitable for refrigerating is a capillary tube with flow characteristics that the inside equilibrium temperature (a temperature at which the freezing capability of the cooling unit is balanced with the thermal load of the insulating box body) is approximately 0 to −10° C. when the cooling unit is operated at a room temperature in combination with the insulating box body. Also, the capillary tube suitable for freezing is a capillary tube with flow characteristics that the same inside equilibrium temperature is approximately −15 to −25° C. Therefore, the capillary tube having the intermediate flow characteristics between the refrigerating and freezing of the present invention has a flow characteristics that the inside equilibrium temperature is approximately −10 to −20° C., for example, when the cooling unit is operated under the same conditions.

As mentioned above, when the capillary tube 35 is set to have the intermediate flow characteristics, a lack of flow of a liquid coolant in the refrigerating region is a concern, but the following configuration is utilized in order to address that concern.

In this type of freezing circuit, a heat exchanging device is formed by soldering the coolant piping 37 on the outlet side of the cooler 36 and the capillary tube 35 together so as to increase general evaporation performance, for example, and to evaporate the mist-state liquid coolant which has not been fully evaporated in the cooler 36. However, in this embodiment, when a heat exchanging device 40 is formed between the capillary tube 35 and the coolant piping 37, a heat exchange portion 40A on the side of the capillary tube 35 is set in a predetermined region at the end on the upstream side in the helical portion 35A. This position of the heat exchange portion 40A is closer to the inlet side when seen from the entire length of the capillary tube 35.

Figure 5A:
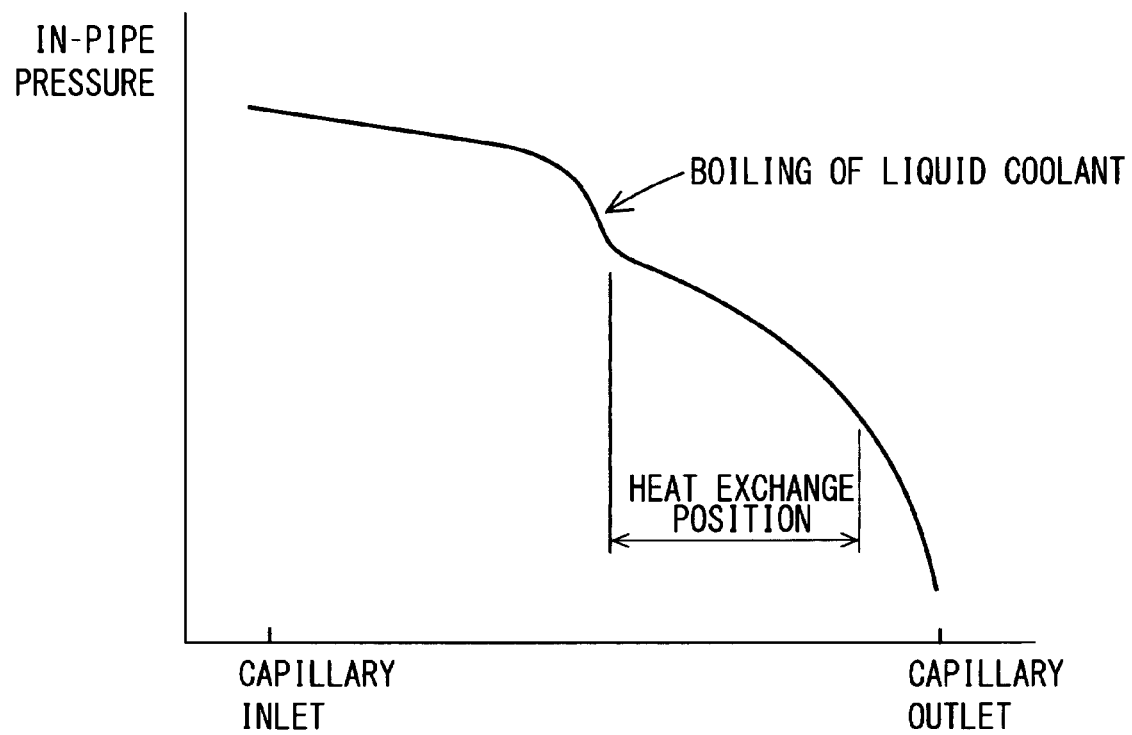
FIG. 5A is a graph showing a pressure change inside a capillary tube.

The capillary tube 35 has a large differential pressure between the inlet and the outlet, but as shown in FIG. 5A, its flow resistance is rapidly increased at a portion where the liquid coolant begins to be boiled (approximately center of the entire length) and the pressure substantially drops from there toward the downstream (outlet side). Conventionally, the heat exchange portion of the capillary tube 35 is set at a position closer to the outlet in the second half region of the entire length. Therefore, the heat is exchanged after in-tube evaporation (boiling) is started. This configuration has been used because in the capillary tube 35, cooling of the downstream side from the heat exchange position causes condensation or rusting, and then the heat exchange position is brought closer to the outlet side as much as possible so that the length of an exposed portion in the cooled state is kept as small as possible.

On the contrary, in this embodiment, as mentioned above, the heat exchange portion 40A of the capillary tube 35 is set at a position closer to the inlet, that is, before the position where the liquid coolant starts to evaporate so as to take large overcooling, and a boiling start point inside the tube can be brought to the downstream side of the capillary tube 35 as shown in FIG. 5B. This results in reduction in total resistance of the capillary tube 35 and substantial increase of the flow rate of the liquid coolant. By this, the problem of the lack in flow is solved when the capillary tube 35 (with the intermediate flow characteristics) is used in the refrigerating region.

In order to obtain the above effect by bringing the boiling start point in the tube to the downstream side of the capillary tube 35, it is only necessary that the heat exchange portion 40A on the side of the capillary tube 35 is provided at least in the first half region of the entire length before the position where the liquid coolant starts to evaporate or more preferably in the first ⅓ of the region from the inlet side (region with more liquid state).

If the heat exchange portion 40A of the capillary tube 35 is provided at a position closer to the inlet, a portion with a long dimension after that is exposed in the cooled state and thus, the portion is preferably separated from the coolant piping 37 as much as possible and is covered by an insulating tube (not shown). By this, condensation and rusting can be prevented.

On the other hand, a lack in throttling in the freezing region (when the capillary tube 35 has the intermediate flow characteristics) is solved by providing an accumulator 42 (liquid separator) immediately after the cooler 36. Provision of the accumulator 42 results in volume adjustment in storing the liquid coolant in the cooling device 31.

In the freezing region, when compared with a pull-down region (region of rapid cooling from a region close to a room temperature to the vicinity of a set temperature) and a refrigerating region, a coolant pressure in the cooler 36 is low (evaporation temperature of the coolant is low) and the density of a coolant gas is low. Thus, a circulation volume of the coolant by the compressor 32 is small. As a result, the excess liquid coolant remains in the cooling device 31, but the excess liquid coolant is stored in the accumulator 42. Thus, the liquid coolant does not excessively distribute in the capillary tube 35 (or the like) but a flow throttle effect is substantially realized in the capillary tube 35. By this, the problem of lack in throttle when the capillary tube 35 with the intermediate flow characteristics is used in the freezing region can be solved.

In other words, with the common use of the capillary tube 35, the capillary tube 35 with the intermediate flow characteristics is used and then, the throttle effect is obtained by providing the accumulator 42 immediately after the outlet of the cooler 36 so that the flow of the liquid coolant is reduced. That is, it is adapted to the freezing region with a low flow-rate and in addition, the heat exchange portion 40A in the capillary tube 35 is set on the side closer to the inlet so as to reduce the total resistance in the tube and to increase the flow rate of the liquid coolant, and thus, it is adapted to the pull-down region and the refrigerating region with a high flow rate.

When the accumulator 42 is provided, if it is installed on the downstream side of a heat exchange portion 40B in the cooling piping 37, there is a possibility that the coolant flows in an air/liquid mixed state in the heat exchange portion 40B, and the liquid coolant is evaporated at this time. In other words, the liquid coolant (which should have been evaporated at the cooler 36) is evaporated at the heat exchange portion 40B which is not useful because it leads to reduction of the cooling capacity from the viewpoint of the entire cooling device 31.

In view of this, in this embodiment, since the accumulator 42 is provided immediately after the outlet of the cooler 36, that is, on the upstream side of the heat exchange portion 40B in the coolant piping 37, only gas coolant flows in the heat exchange portion 40B and thus, excessive evaporation action is not generated in the heat exchange portion 40B. Therefore, the inherent cooling capacity of the entire cooling device 31 can be ensured.

Also, since the heat exchange portion 40A in the capillary tube 35 is set on the side closer to the inlet, there is a concern that the flow of the liquid coolant might also be increased on the freezing side, but this concern is addressed in the embodiment described below.

The cooling device 31 (provided with the capillary tube 35) is formed by sharing the coolant between the high pressure side and the low pressure side. Conceptually, the coolant exists in the condenser 33 and next in the cooler 36 in the refrigerating region (including the pull-down region). In the freezing region, most of coolant exists in the cooler 36 and the accumulator 42, but contrary to the refrigeration region, little of the coolant exists in the condenser 33. Therefore, in the refrigerating region, though the coolant flows into the capillary tube 35 as a complete liquid flow, since it flows in the gas/liquid mixture in the freezing region, the flow itself is remarkably decreased. Therefore, even if heat exchange is carried out at a position closer to the inlet of the capillary tube 35 for over-cooling, it does not lead to much flow increase.

On the other hand, by providing the accumulator 42, a flow decrease is also a concern in the refrigerating region (including the pull-down region), but for a reason opposite from above In the refrigerating region (including the pull-down region), a circulation volume of the coolant by the compressor 32 is large, and little liquid coolant remains in the cooling device 31 and is not stored in the accumulator 42. Thus, there is little fear of a flow rate decrease.

As mentioned above, the cooling unit 30 has a similar structure for refrigerating and freezing, while operation control is carried out individually. This is based on the idea that, first, if the same cooling unit 30 is commonly used, there is a fear that the temperature characteristics at the pull-down cooling, for example, might change drastically whether it is refrigerating or freezing or depending on conditions such as the size of the internal volume.

In the cooling unit loaded with the inverter compressor, the maximum allowable high-speed operation is generally carried out in the pull-down cooling, but in the case of the pull-down cooling under the same condition without any food inside, there is a distinctive difference in an inside temperature curve among a large, intermediate and small insulating box bodies (inside volume). That is because the difference in the temperature drop degree is in proportion to the surface area of the insulating box body, and the larger is the box, the larger the heat capacity of an inner wall material or racks inside when the temperature difference inside and outside is the same.

On the other hand, in the case of a cooler and refrigerator for professional-use (also, a freezer unit and a freezer and refrigerator unit), an emphasis is put on the temperature characteristics of pull-down cooling. For example, cooling from the inside temperature as high as 20° C. is substantially limited to cases where there is a re-start after several hours since the power is turned off for maintenance or the like, leaving the door open for several minutes at carrying-in of food materials, putting in hot food and the like, in addition to initial operation after installation. But with regard to refrigerators for professional-use, the door is frequently opened/closed for putting food in/out, resulting in an ambient temperature that is relatively high. Taking these circumstances into consideration, the inside temperatures can easily rise and a characteristic of temperature drop as a return force at that time can be sufficiently expected.

Therefore, performance tests at the pull-down cooling is indispensable, but since the cooling speed largely depends on an insulating box body as mentioned above, the performance tests should be conducted in a state where the cooling unit and the insulating box body on which the unit is mounted are combined. Thus, even if the cooling unit is made common, complexity of the performance test can not be solved.

Thus, in this embodiment, a configuration is provided for temperature control of the inside along a predetermined temperature curve without depending on the insulating box body at the pull-down cooling.

Figure 6:
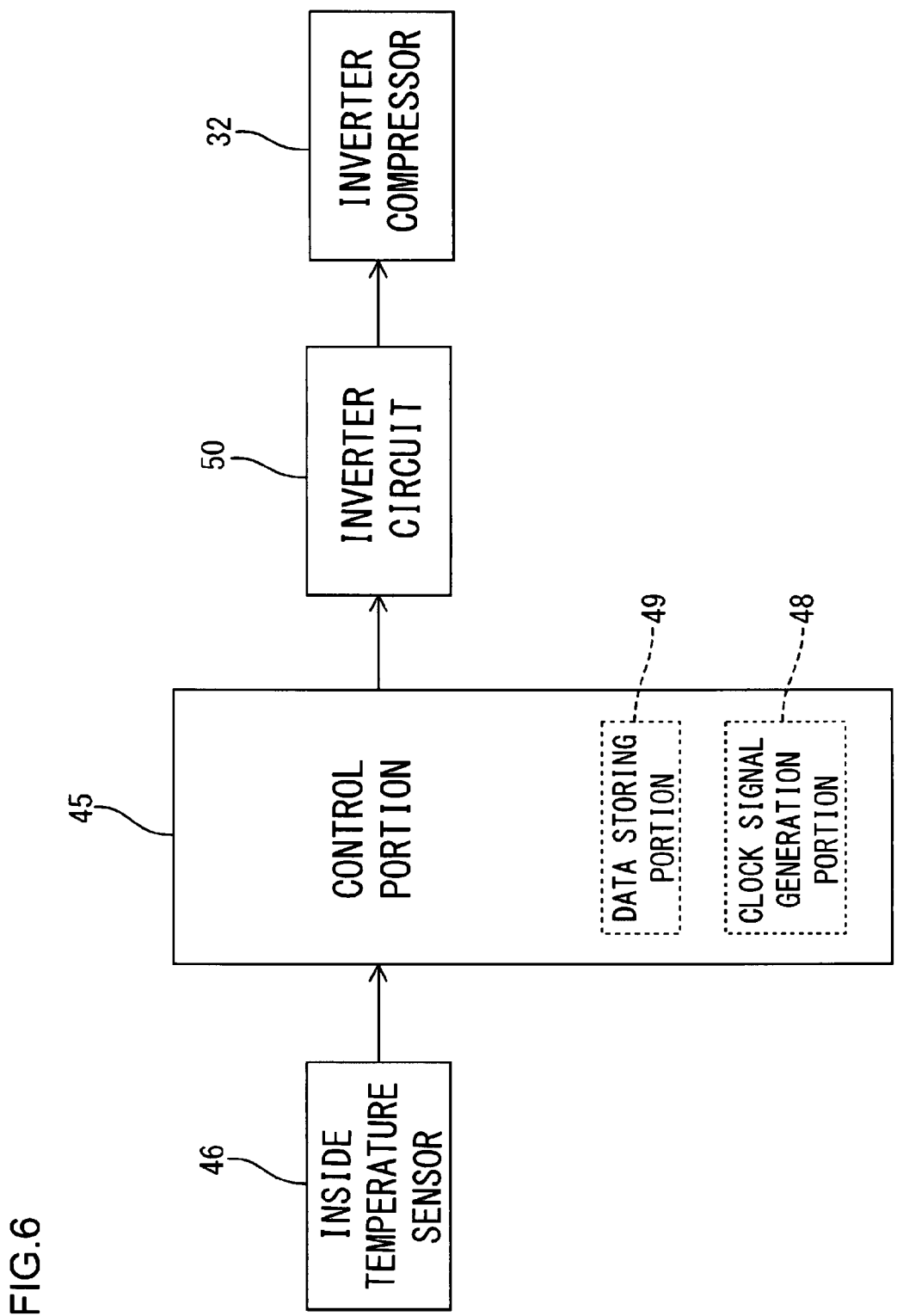
FIG. 6 is a block diagram of a control mechanism portion of an inverter compressor.

For that purpose, as shown in FIG. 6, a control portion 45 is provided with a microcomputer (and the like) for executing a predetermined program and is accommodated in an electric equipment box 39 provided on the upper face of the unit table 38 on which the above cooling unit 30 is mounted. This control portion 45 functions (as will be described later) as a controlled operation controller and a high-temperature compensation controller. To the inlet side of the control portion 45, an inside temperature sensor 46 for detecting an inside temperature is connected, resulting in an inside temperature sensor for measuring the inside temperature.

Figure 7:
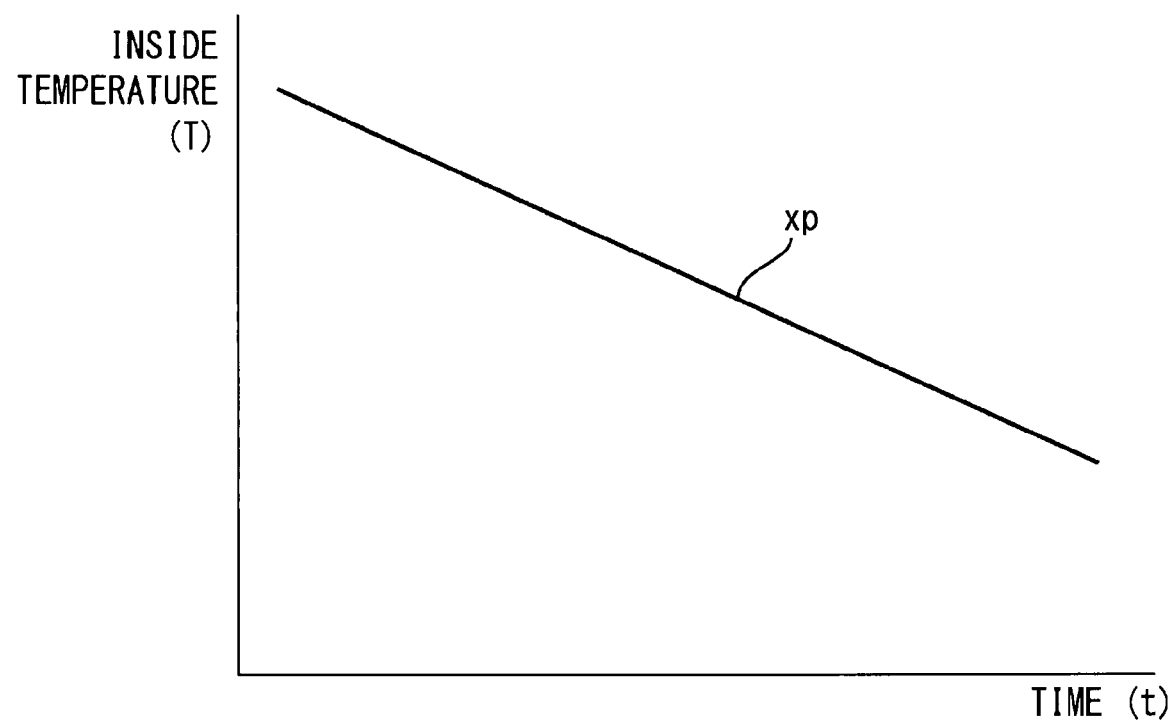
FIG. 7 is a graph showing pull-down cooling characteristics.

At the control portion 45, a data storing portion 49 as well as a clock signal generation portion 48 are provided, and in the data storing portion 49, a linear function straight line xp is selected and stored as shown in FIG. 7 as a temperature curve to be a target at the pull-down cooling. When the temperature curve is a straight line xp as above, a cooling speed to be a target (temperature drop amount per unit time: $\Delta T/\Delta t$) becomes a constant value Ap regardless of the inside temperature.

To the output side of the control portion 45, the inverter compressor 32 is connected through an inverter circuit 50.

As an operation, when the inside temperature exceeds a set temperature by a predetermined value, the pull-down control is started and the inside temperature is detected per predetermined sampling time.

Figure 8:
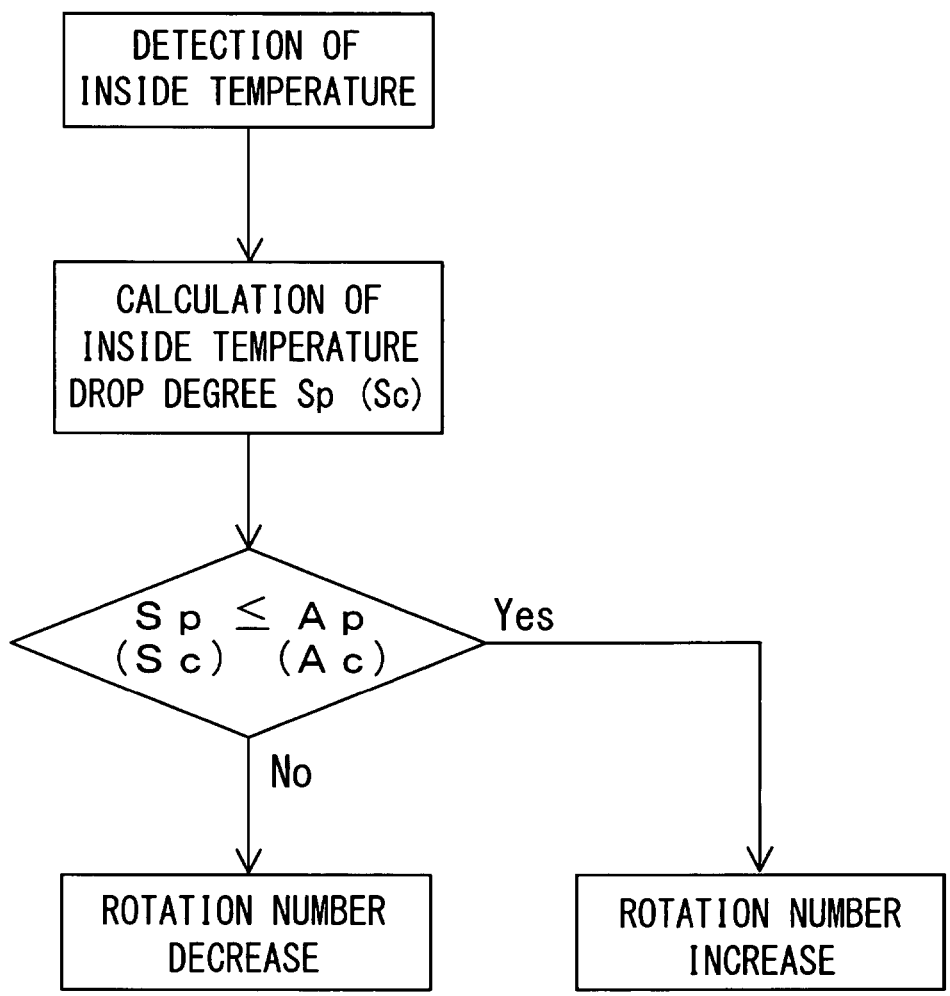
FIG. 8 is a flowchart showing a control operation of the inverter compressor in a pull-down region.

As shown in FIG. 8, at every sampling time, an actual cooling speed Sp is calculated based on the detected inside temperature, and this calculated value Sp is compared with a target value Ap read out from the data storing portion 49. If the calculated value Sp is not more than the target value Ap, the rotation number of the inverter compressor 32 is increased by the inverter circuit 50, while if the calculated value Sp is larger than the target value Ap on the contrary, the rotation number of the compressor 32 is decreased, which is repeated at every predetermined sampling time and the pull-down cooling is carried out along the temperature curve (straight line xp).

In the above pull-down cooling, controlled cooling operation is executed for maintaining the inside temperature both for refrigerating and freezing in the vicinity of the set temperature, but with provision of the inverter compressor 32 as above, the following advantages can be obtained. In the controlled cooling operation, when control is made so that the speed (rotation number) of the inverter compressor 32 is lowered in a stepped manner in the vicinity of the set temperature, temperature drops extremely slowly and continuous ON time of the compressor 32 becomes overwhelmingly long. In other words, since the number of switching times of on/off of the compressor 32 is drastically decreased and operation is made at a low rotation, higher efficiency and energy saving can be realized.

In the above, the cooling capacity at low-speed operation of the inverter compressor 32 needs to be set so that an assumed standard thermal load is exceeded. With the cooling capacity falling short of the assumed thermal load, the inside temperature does not rise to the set temperature but is thermally balanced and remains short of that. When the cooling units 30 include the inverter compressor 32 as in this embodiment, the largest heat intrusion amount in the insulating box body to be attached should be considered as a thermal load.

Particularly in the refrigerator for professional-use (also in the freezer), restriction on a variation in temperature distribution inside is given a special consideration so that food materials can be stored with a constant quality, and for that purpose, a larger air amount is allocated for the cooling fan 25 to circulate air, which results in a large heat generation amount of a motor. Moreover, when conditions such as heat capacity of the food materials, ambient temperature, opening/closing frequency of the door and the like are combined, the thermal load can become unexpectedly large in some cases, and the inside temperature might remain short of the set temperature though the inverter compressor 32 is operated at a low speed or even if the temperature drops, the change is too slight and the ON time can be abnormally long.

There is an idea that it is only necessary for the temperature to be kept extremely close to the set temperature as a function of a refrigerator, but for the refrigerator, it is not necessarily preferable that the operation is continued with the inverter compressor 32 being on. That is because while the operation is continued, frost keeps on adhering to the cooler 36 by an intruding air from outside during the opening/closing of the door 17 and vapor from the food materials. On the other hand, if the inverter compressor 32 is turned off appropriately, the temperature of the cooler 36 is raised to 0° C. or above and the frost is removed. Thus, it is preferable also for maintenance of the heat exchange function of the cooler 36 in the refrigerator to have an appropriate off time.

Then, in this embodiment, saving energy is realized by utilizing the advantages of using the inverter compressor 32 in the controlled cooling operation, and moreover, control means is taken for allocating OFF time assuredly.

Figure 9:
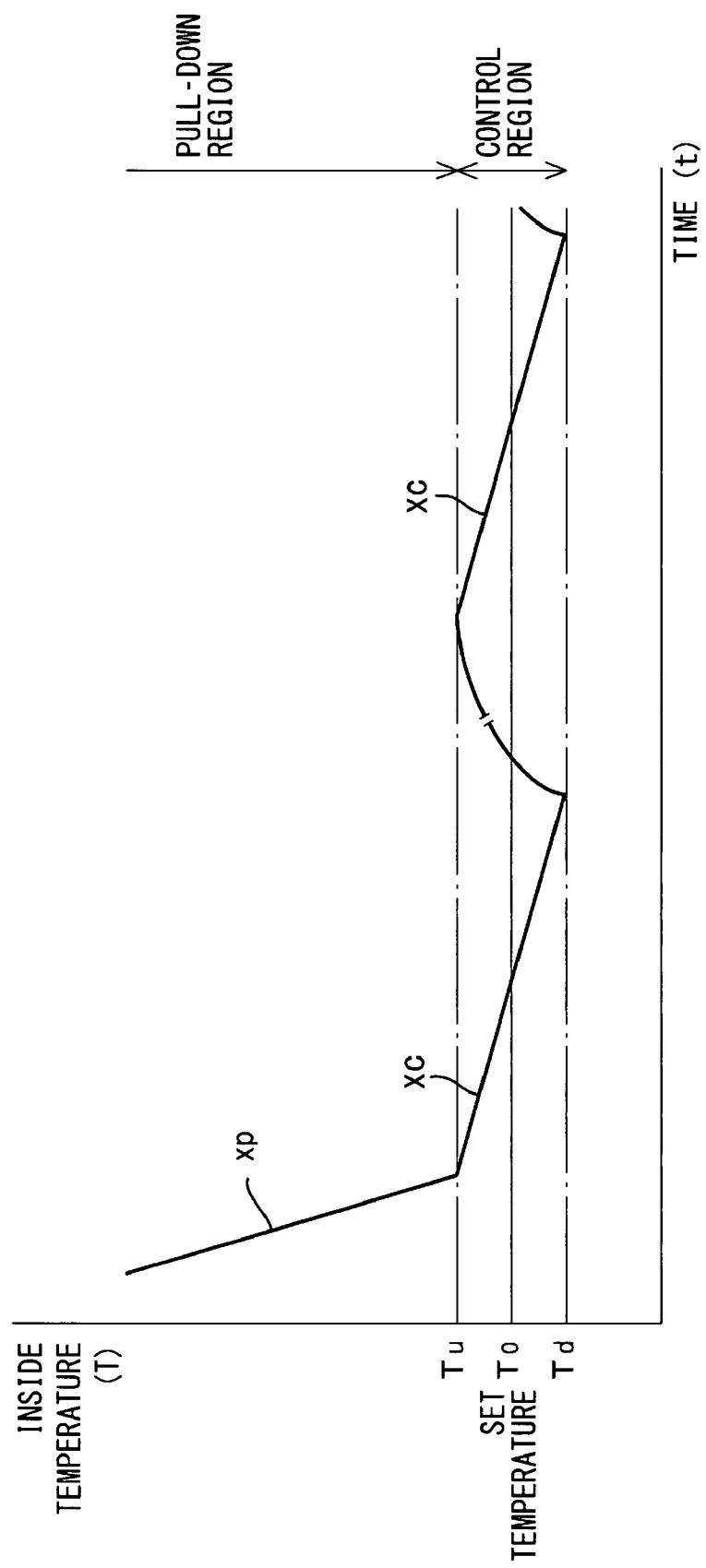
FIG. 9 is a graph showing a temperature change in the pull-down region and a control region.

In short, during operation of the inverter compressor 32 in the temperature region in which the controlled cooling operation is carried out, similarly to the above pull-down region, driving of the inverter 32 is controlled to follow the temporal change mode (temperature curve in cooling) of an appropriate temperature capable of highly efficient operation. This temperature curve is set, as shown in FIG. 9, for example, as a straight line xc whose gradient is more gentle than the temperature curve (straight line xp) at the pull-down cooling. In other words, the inside cooling speed Ac of the cooling mode based on this temperature curve xc has a value smaller than the cooling speed Ap of the temperature curve xp.

Data on the temperature curves xp, xc determining these cooling modes is stored in the data storing portion 49 constituted by the memory device such as EPROM and utilized at execution of a program for the controlled cooling operation similarly stored in the control portion 45.

The control operation of the controlled cooling operation is similar to that in the pull-down cooling, and once the inside temperature is lowered by the pull-down cooling to an upper limit value higher than the set temperature TO by a predetermined value, the operation is transferred to the controlled cooling operation. In detail, as shown in FIG. 8, the inside temperature is detected at every predetermined sampling time and based on the detected inside temperature, the actual cooling speed Sc is calculated. The calculated value Sc is compared with the target value Ac (constant) of the inside cooling speed in the temperature curve xc and when the calculated value Sc is not more than the target value Ac, the rotation speed of the inverter compressor 32 is increased, while if the calculated value Sc is larger than the target value Ac, the rotation number of the compressor 32 is decreased, and this is repeated at every predetermined sampling time, resulting in the temperature dropping slowly following the temperature curve xc (straight line).

When the inside temperature drops below a lower limit temperature lower than the set temperature TO by a predetermined value, the inverter compressor 32 is turned off and the inside temperature slowly rises. When it returns to the upper limit temperature, the temperature control is carried out along the temperature curve xc again and the repetition maintains the inside at approximately the set temperature TO.

According to the control at this controlled cooling operation, cooling can be realized in an energy saving manner utilizing the inverter compressor 32, and moreover, appropriate operation stop time of the inverter compressor 32 can be taken assuredly. Thus, a type of defrosting function is exerted by the cooler 36 and frost formation in a large quantity can be prevented.

On the refrigerating side as above, for example, an operation program Px (refrigerating program Px) is provided for controlling the inside so that driving of the inverter compressor 32 follows the temperature characteristic X including the temperature curves xp, xc over the controlled cooling operation from the pull-down cooling.

On the other hand, on the freezing side, even if the basic control operation is the same, the inside set temperature and an ideal curve are different. Thus, an operation program Py (freezing program Py) for controlling the driving of the inverter compressor 32 which follows the temperature characteristic Y in the same figure, for example, is required.

At each cooling unit 30, the electric equipment box 39 is attached as mentioned above, and the control portion 45 is provided. Both the refrigerating program Px and the freezing program Py mentioned above are stored therein with data for the respective ideal curves.

The present embodiment is constructed as above, and to an installation site, the main body 10 made of the insulating box body and the two same cooling units 30 are divided and carried in. Then, they are attached to the opening portions 21 of the ceiling portions of the refrigerating chamber 15 and the freezing chamber 16, respectively. Then, the inside set temperature is inputted to the refrigerating chamber 15 and the freezing chamber 16, respectively, and at the control portion 45 attached to the cooling unit 30 attached on the side of the refrigerating chamber 15, the refrigerating program Px is selected by a switch or the like, not shown, provided at the electric equipment box 39, while at the control portion 45 attached to the cooling unit 30 provided on the side of the freezing chamber 16, the freezing program Py is selected.

The refrigerating chamber 15 and the freezing chamber 16 are cooling-controlled based on the individual operation programs Px, Py as above.

Figure 10:
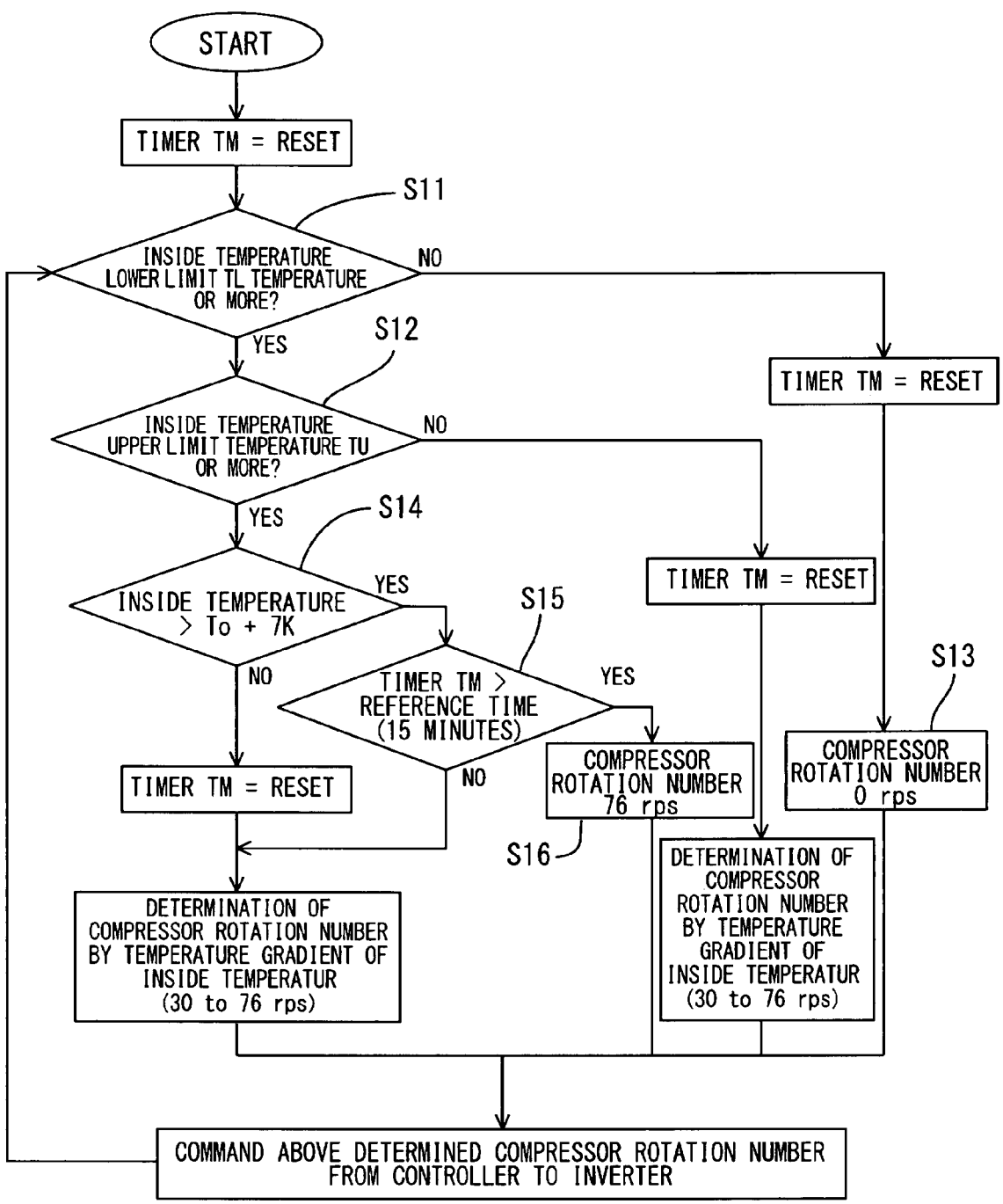
FIG. 10 is a flowchart showing a controlled cooling operation and an operation of a high-temperature compensation controller.

For the controlled cooling operation, explaining the refrigerating chamber 15, for example, again, the control shown in a flowchart in FIG. 10 is executed. That is, when the operation is transferred to the controlled cooling operation by the pull-down cooling ("start"), first, a timer TM is reset, a relation in magnitude among the inside temperature, a lower limit temperature TL and an upper limit temperature TU is determined at Step S11 and Step S12, and if the value falls below the lower limit temperature TL, the operation of the inverter compressor 32 is stopped (Step S13), and in the other cases, the inverter compressor 32 is operated. Here, as shown in FIG. 8, based on the inside temperature detected per sampling time, the actual inside cooling speed Sc is calculated and compared with the target value Ac. If the calculated value Sc is not more than the target value Ac, the speed of the inverter compressor 32 is increased, while in the opposite case, the speed is reduced, and this repetition causes the temperature to slowly drop following the predetermined temperature curve (straight line xc). When the inside temperature falls to the lower limit temperature TL, the inverter compressor 32 is turned off, the inside temperature slowly rises, and when it returns to the upper limit value TU, the temperature control following the temperature curve xc is carried out again. By this repetition, the inside is maintained approximately at the set temperature TO. The rotation speed set for the inverter compressor 32 is, in this embodiment, in a range of 30 to 76 rps by a step of 5 rps.

On the side of the freezing chamber 16, the same controlled cooling operation is also carried out in a region with a lower set temperature.

If the door is repeatedly opened/closed while the above controlled cooling operation is executed, in the case of determination of the rotation speed of the inverter compressor 32 only by the above comparison with the target temperature curve xc, there is a concern that the inside temperature gradually separates from the set temperature TO and rises. If the door is opened/closed again during a period from closing of the door to gradual cooling of the inside temperature close to the set temperature, rapid drop of the inside temperature after the door is closed causes the rotation of the inverter compressor 32 to switch to a lower speed.

Then, in this embodiment, if the inside temperature exceeds the upper limit temperature TU, it is further determined whether the inside temperature exceeds the set temperature TO by 7K or more (Step S14) and in the case of "Yes", it is determined if the timer TM has counted a predetermined reference time (15 minutes, for example) or not (Step S15). If a state where the temperature is higher than the set temperature TO by 7K or more for the reference time (15 minutes) or longer, it is "Yes" at step S15, and the program goes to step S16, where the inverter compressor 32 is driven at the highest rotation speed 76 rps, and the cooling device 31 is cooled by the maximum cooling capacity at the controlled cooling operation. This state lasts until the inside temperature falls below the lower limit temperature TL and it is "No" at Step S11, by which abnormal temperature rise of the inside temperature is prevented assuredly.

As mentioned above, in this embodiment, since in the controlled cooling operation, temperature slowly drops following the temperature curve (straight line xc) with a gentle gradient capable of highly-efficient operation, the continuous ON time of the inverter compressor 32 gets longer, in other words, the number of switching times of on/off of the inverter compressor 32 is drastically decreased. Also, because of the operation at the low rotation, higher efficiency and energy saving can be realized. On the other hand, since the lower end of the temperature curve (straight line xc) reaches the lower limit temperature TL, the operation stop time of the inverter compressor 32 can be taken assuredly with an appropriate interval, during which a type of defrosting function is exerted by the cooler 36 so that frost formation in a large quantity can be prevented.

Moreover, since the cooling capacity of the cooling device 31 is made higher than the cooling capacity in the controlled cooling operation by maximizing the cooling capacity by the cooling device 31 on the condition that the state where the inside temperature is higher than the set temperature TO by the predetermined temperature (7K) and lasts for 15 minutes or longer, for example, even if the door is frequently opened/closed and the inside temperature tends to gradually rise, it can be detected at an early stage and the inside temperature can be kept in the vicinity of the set temperature.

When the cooler and refrigerator is actually used, a frost-formation degree can be varied largely depending on conditions including an installation site, a frequency to open/close the door, the type of food materials to be stored or the like. Thus, by preparing several types of programs with different operating time or the like of the inverter compressor 32 for selective execution according to the use condition, the optimal controlled cooling operation according to the use condition can be enabled.

Second Embodiment

Figure 11:
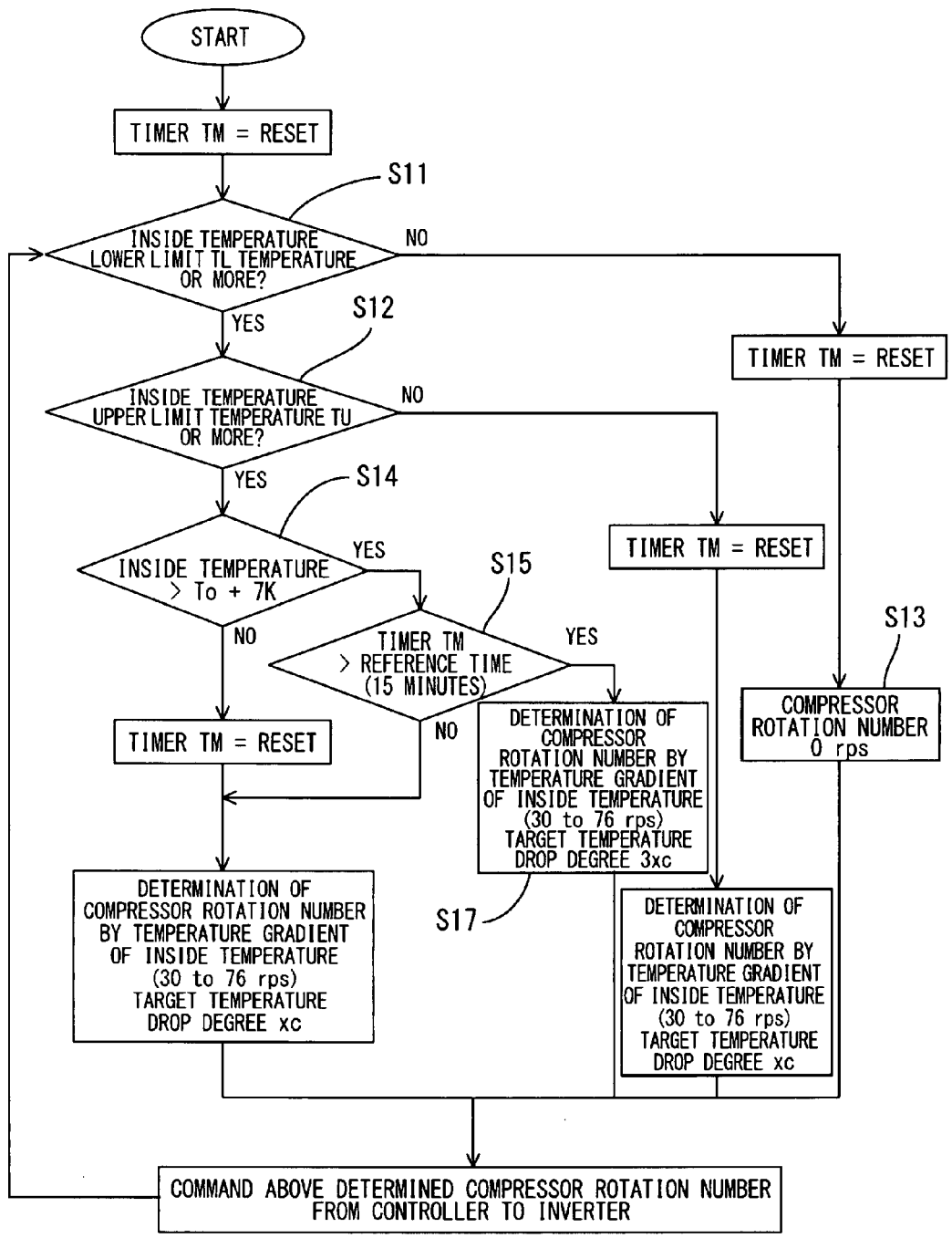
FIG. 11 is a flowchart showing the controlled cooling operation and the operation of the high-temperature compensation controller according to a second embodiment of the present invention.

Next, a second embodiment of the present invention will be described based on FIG. 11. A difference from the above first embodiment is software configuration functioning as a high-temperature compensation controller, while the other configurations are the same as the first embodiment. Here, as shown in FIG. 11, when it is determined as "Yes" at Step S15 and the cooling capacity of the cooling device 31 is to be increased, the measured cooling speed is compared with the target cooling speed similarly to the controlled cooling operation, and the rotation speed of the inverter compressor 32 is determined according to the comparison result (Step S17). That is, the larger the difference is between the both, the faster the rotation speed is set. The target cooling speed here is set to 3 times (3xc) that of the controlled cooling operation, by which a large cooling capacity can be exerted all the time and the inside temperature can be lowered rapidly.

Third Embodiment

Figure 12:
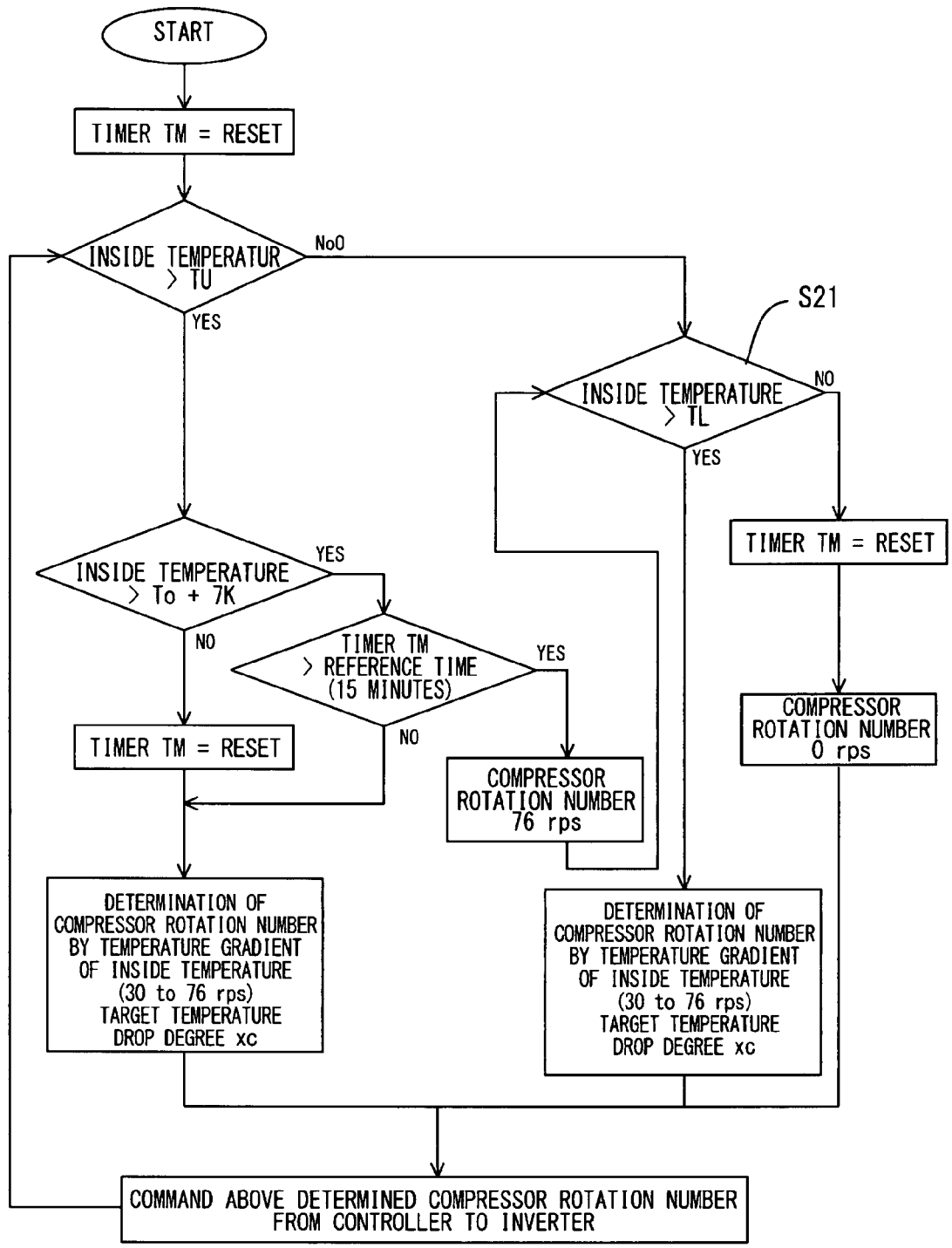
FIG. 12 is a flowchart showing the controlled cooling operation and the operation of the high-temperature compensation controller according to a third embodiment of the present invention.

FIG. 12 is a flowchart showing the controlled cooling operation and an operation of the high-temperature compensation controller according to the third embodiment of the present invention. In the first embodiment, the cooling operation by the high-temperature compensation controller is finished when the inside temperature reaches the upper limit temperature TU ("No" at Step S12) and the operation returns to the controlled cooling operation. In this third embodiment, when the inside temperature reaches the lower limit temperature TL ("No" at Step S21), the cooling operation by the high-temperature compensation controller is finished. The other configurations are the same as those of the first embodiment. In this case, too, the cooling operation by the high-temperature compensation controller may increase the cooling capacity by causing the target cooling speed to be larger than that in the controlled cooling operation (3 times, for example) similarly to the second embodiment.

Fourth Embodiment

Figure 13:
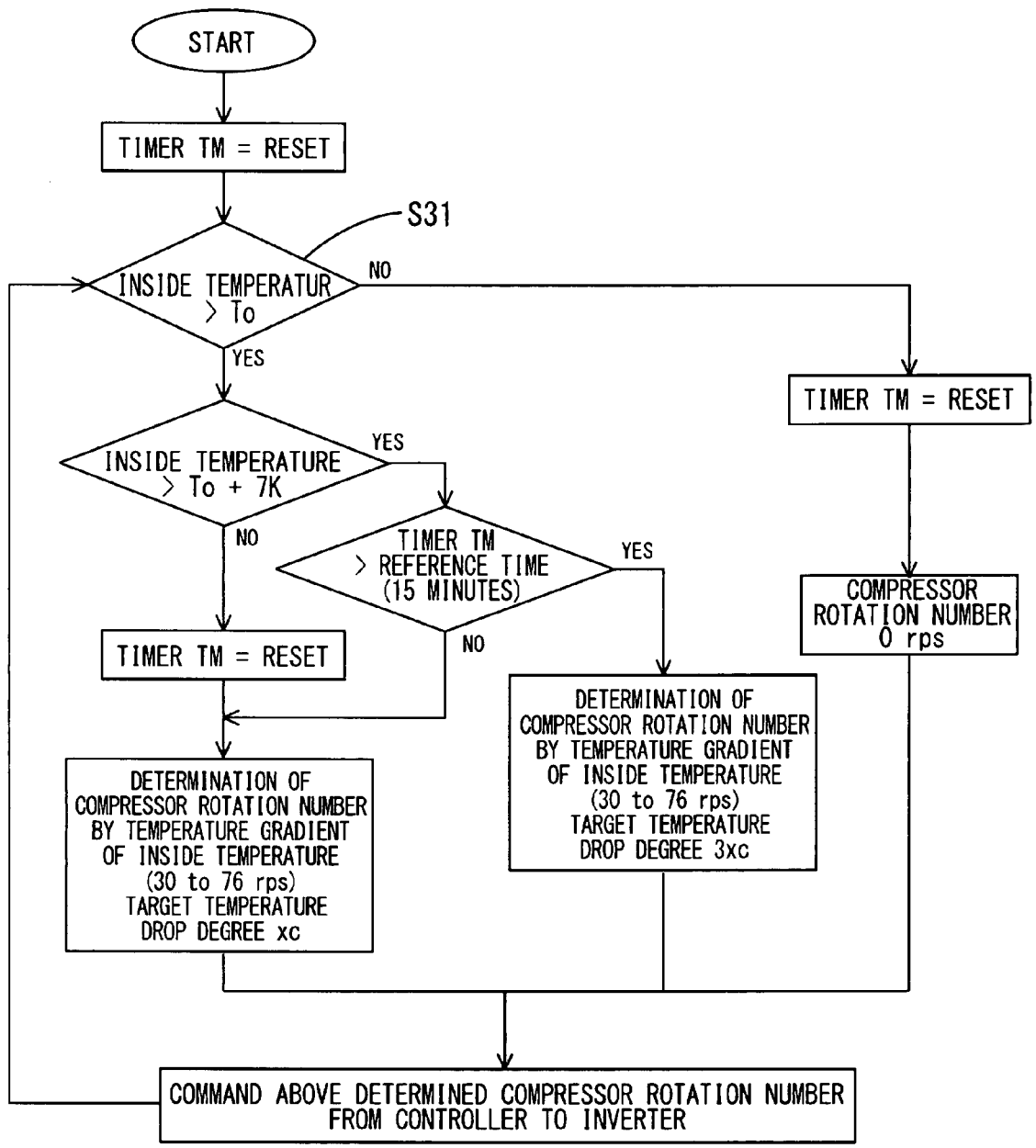
FIG. 13 is a flowchart showing the controlled cooling operation and the operation of the high-temperature compensation controller according to a fourth embodiment of the present invention.

FIG. 13 is a flowchart showing the controlled cooling operation and an operation of the high-temperature compensation controller according to a fourth embodiment of the present invention. In the first to third embodiments, when the controlled cooling operation is to be executed, the upper limit temperature TU and the lower limit temperature TL (with a difference of 1.5 K above and below the set temperature) are set so as to carry out so-called hysterisis operation (by which frequent turning on/off of the inverter compressor 32 is prevented), but in the fourth embodiment, the measured inside temperature is merely compared with the set temperature TO (Step S31). By this, the configuration can be simplified. In this case, too, the cooling capacity of the cooling operation by the high-temperature compensation controller may be increased by maximizing the rotation speed of the inverter compressor 32 similarly to the first embodiment.

Fifth Embodiment

Figure 14:
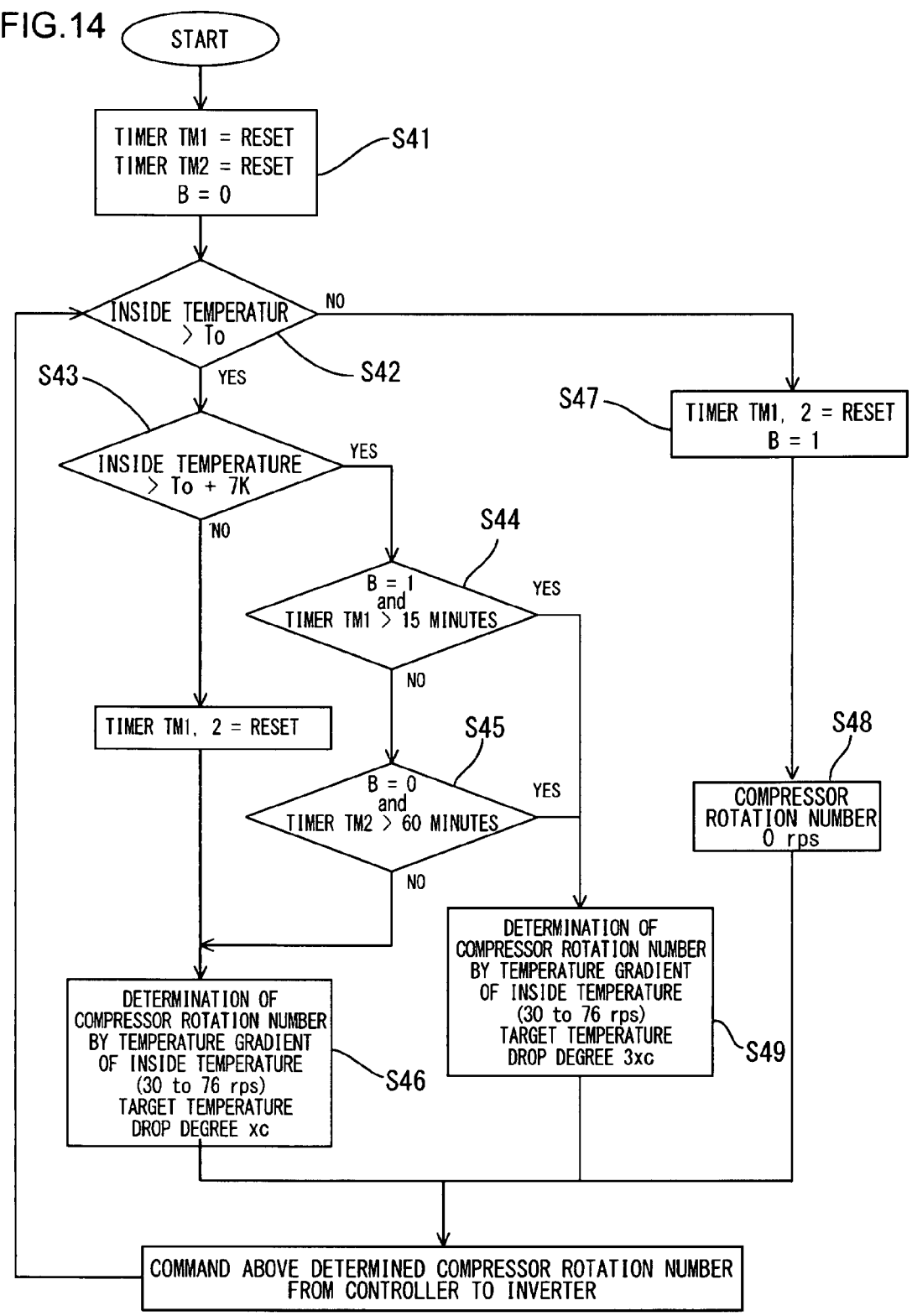
FIG. 14 is a flowchart showing the controlled cooling operation and the operation of the high-temperature compensation controller according to a fifth embodiment of the present invention.
Figure 15:
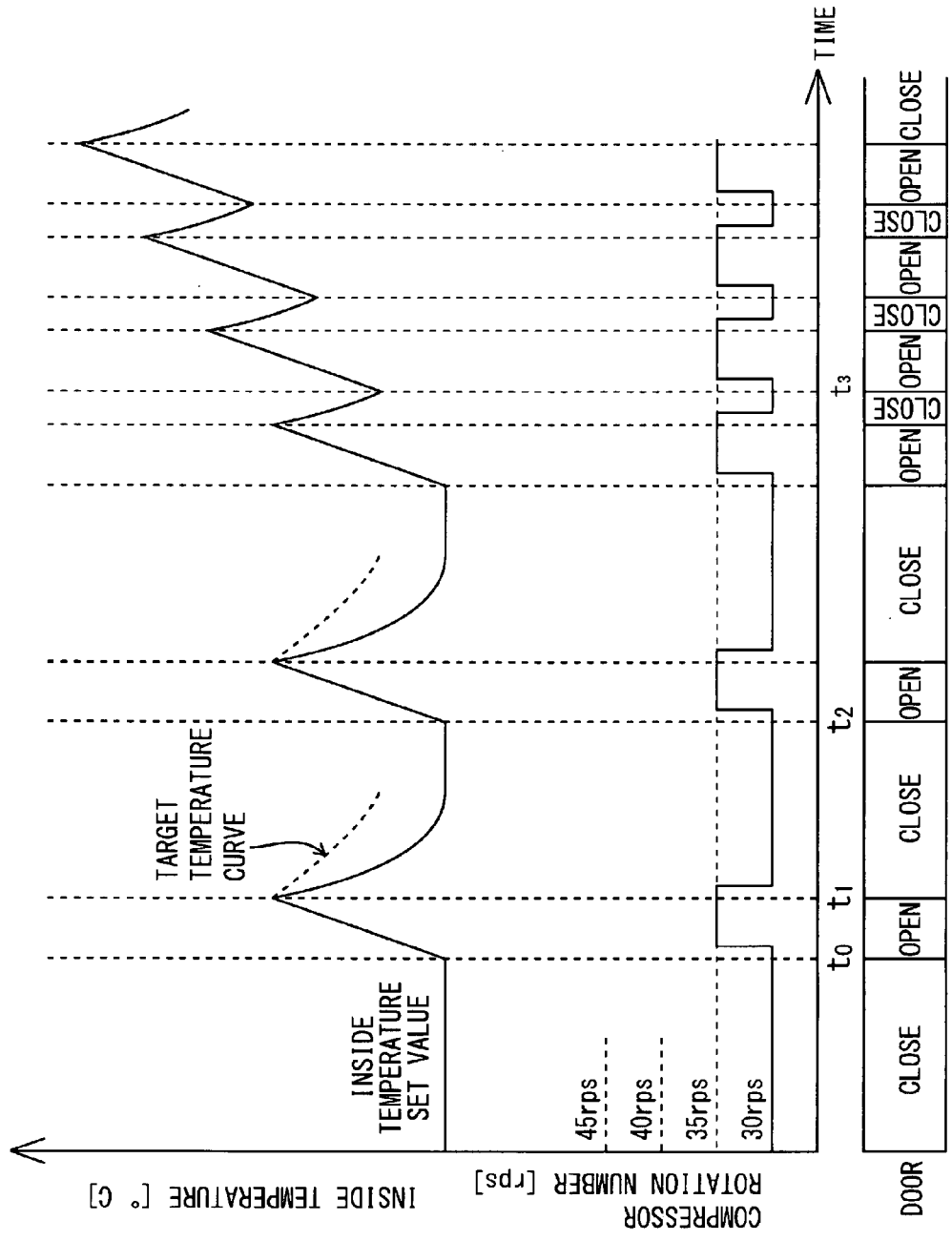
FIG. 15 is a temperature graph for explaining a cause for temperature rise due to door opening/closing.

Next, a fifth embodiment of the present invention will be described referring to FIG. 14. In the fifth embodiment, the operation of the high-temperature compensation controller is invalidated at installation of a refrigerator, while the other configurations being the same as those of the first embodiment. Invalidating means for invalidating the control by the high-temperature compensation controller can be configured as shown by a flowchart in FIG. 14, for example.

When a refrigerator is installed and powered on, first, timers TM1 and TM2 are reset and a flag B corresponding to an uncooled state memory means is also reset (B=0) (Step S41). After that, at Step S42, it is determined if the measured inside temperature is not less than the set temperature TO or not. Immediately after power-on, the inside temperature is substantially equal to a room temperature and it is not less than the set temperature TO. Thus, the program goes on to the subsequent Step S43, where it is determined if the inside temperature is not less than the set temperature TO+7 K or not. Again, it is "Yes" immediately after the power-on, and the program goes on to the subsequent Step S44. Here, since the flag B has not been set yet (B=0), the determination result at Step S44 is "No" and the program goes on to Step S45.

Here, if a second reference time (60 minutes, for example) has not elapsed since power-on, a counted value of the timer TM2 has not reached 60 minutes, and the determination result at Step S45 is "No". And the program goes to Step S46, where the rotation speed of the inverter compressor 32 is determined according to a temperature gradient of the inside temperature. The program returns to Step S42, and the above operation is repeated so that the inverter compressor 32 is continuously operated, and the inside temperature is lowered according to the target temperature curve (cooling speed) set in advance. By setting the second reference time and the temperature curve so that the time until the set temperature TO is reached is shorter than the above second reference time when cooling is carried out with the cooling speed as a target, "No" is obtained at Step S42 before the timer TM2 is timed up, the timer TM1 is reset at Step S47, the flag B is set, and the inverter compressor 32 is stopped (Step S48).

After that, if the inside temperature gradually rises due to stop of the cooling device 31, "Yes" is obtained at Step S42, and on the condition that the inside temperature is not the set temperature TO+7 K or more ("Yes" at Step S43), the program goes to Step S46 and the controlled cooling operation is executed. Since the operation is repeated until the inside temperature is cooled to the set temperature TO or less, the inside is kept in the vicinity of the set temperature TO.

Here, if the inside temperature is gradually raised by frequent opening/closing of the door similarly to the first embodiment, the determination result at Step S43 becomes "Yes" when the inside temperature exceeds the set temperature TO+7 K and thus, the program goes on to Step S44. However, after cooling is carried out to the set temperature TO by the pull-down control after power-on, since the flag B has been set (Step S47), "Yes" is obtained at Step S44, and the program goes on to Step S49 and rapid cooling operation is carried out by the high-temperature compensation controller. That is, similarly to the second embodiment, the cooling operation with the target cooling speed set to 3 times (3xc) that of the controlled cooling operation is executed, by which a large cooling capacity is exerted all the time and the inside temperature is rapidly lowered.

Therefore, in the fifth embodiment, too, the operation stop time of the inverter compressor 32 can be ensured with an appropriate interval similarly to the first embodiment, frost formation in a large quantity to the cooler 36 can be prevented even if the door 17 is frequently opened/closed and the inside temperature tends to gradually rise, it can be detected at an early stage and the inside temperature can be kept close to the set temperature.

The cooling operation that rapidly lowers the inside temperature by the above operation of the high-temperature compensation controller is less efficient than the controlled cooling operation. With this regard, particularly in this fifth embodiment, the operation of the high-temperature compensation controller is invalidated and configured not to be executed at the pull-down cooling when the refrigerator is installed and to be executed only after the inside has been cooled to the set temperature. Thus, wasteful energy consumption can be restricted.

Other Embodiments

The present invention is not limited to each embodiment described by the above descriptions and drawings and includes the following embodiments, for example, in its technical scope:

(1) In the above embodiments, the temporal change mode of the target temperature drop is set as a straight line, but the present invention is not limited to that, because a curve represented by a quadratic function may be used, for example.

(2) In the above embodiments, the inverter compressor is used for the compressor as means for adjusting the cooling capacity of the cooling unit, but the present invention is not limited to that, because other variable capacity compressors such as multi-cylinder compressor with unload function for adjusting the number of cylinders to be driven according to a load may be used.

(3) The present invention is not limited to a case where the cooling units shown in the above embodiments are made common for refrigerating and freezing, because the present invention can be applied to a case where the cooling unit is exclusively for refrigeration or freezing. Desired controlled cooling operation can be realized for individual cooler and refrigerator.

(4) Moreover, the cooling device does not have to be unitized, as we say, but a compressor, an evaporator and the like may be individually attached.

(5) In the fifth embodiment, the operation of the high-temperature compensation controller is invalidated in the pull-down cooling operation after power-on of the refrigerator, but it is not limited to that, because invalidation may be effected after defrosting operation of the cooler when the inside temperature temporarily rises to a high-temperature. In this case, the uncooled state memory device is reset when the defrosting operation is carried out and set when the inside temperature reaches the set temperature TO by cooling after that.

The invention claimed is:

1. A cooler and refrigerator configured to execute a controlled cooling operation for maintaining an inside temperature approximately at a set temperature by controlling a cooling capacity of a cooling device for cooling an inside of the cooler and refrigerator based on a comparison between the inside temperature measured by an inside temperature sensor and a set temperature set in advance, wherein
the cooling device capable of controlling the cooling capacity comprises:
a memory device storing a target temporal change mode of a cooling speed, in a temperature region in which the controlled cooling operation is carried out, as data;
a controlled operation controller for calculating an actual cooling speed and changing the cooling capacity so that the actual cooling speed varies following the target temporal change mode;
a high-temperature compensation controller for changing the target temporal change mode on the condition that the inside temperature becomes higher than the set temperature by a predetermined temperature; and
an inverter compressor capable of controlling the cooling capacity, and
the controlled operation controller includes:
a temperature change calculation portion for detecting the inside temperature based on a signal from the inside temperature sensor per predetermined sampling time and calculating the actual cooling speed at each sampling time based on the inner temperature;
a target cooling speed output portion for outputting a target cooling speed based on the target temporal change mode at each sampling time;
a comparison portion for comparing the actual cooling speed with the target cooling speed; and
a speed control portion for (i) increasing the cooling capacity, when the actual cooling speed is smaller than the target cooling speed and (ii) lowering the cooling capacity, when the actual cooling speed is higher than the target cooling speed, based on a comparison result of the comparison portion.

2. The cooler and refrigerator according to claim 1, wherein
an uncooled state memory device is brought into a reset state, when said inside temperature is higher than a temperature region in which said controlled cooling operation is carried out, and (ii) brought into a set state, after the inside temperature is cooled to the temperature region in which said controlled cooling operation is carried out, and
an invalidating means is provided for invalidating control by said high-temperature compensation controller, when the uncooled state memory device is in said reset state.

3. The cooler and refrigerator according to claim 2, wherein
the high-temperature compensation controller is configured to be operated on the condition that the state where said inside temperature is higher than said set temperature by a predetermined temperature continues for a predetermined reference time, and
said invalidating means prevents operation of said high-temperature compensation controller by setting said reference time at said high-temperature compensation controller longer.

* * * * *